United States Patent
Bhattacharyya et al.

(10) Patent No.: US 10,669,174 B2
(45) Date of Patent: Jun. 2, 2020

(54) WATER PURIFICATION DEVICE AND A METHOD OF DECONTAMINATING A WATER SUPPLY

(75) Inventors: Dibakar Bhattacharyya, Lexington, KY (US); Li Xiao, Lexington, KY (US)

(73) Assignee: THE UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 860 days.

(21) Appl. No.: 13/438,253

(22) Filed: Apr. 3, 2012

(65) Prior Publication Data

US 2013/0105405 A1     May 2, 2013

Related U.S. Application Data

(60) Provisional application No. 61/551,631, filed on Oct. 26, 2011.

(51) Int. Cl.
    *C02F 1/70*           (2006.01)
    *C02F 1/00*           (2006.01)
    *B82Y 30/00*         (2011.01)
    *C02F 101/36*       (2006.01)
    *C02F 1/66*           (2006.01)

(52) U.S. Cl.
CPC .............. *C02F 1/705* (2013.01); *B82Y 30/00* (2013.01); *C02F 1/008* (2013.01); *C02F 1/66* (2013.01); *C02F 2101/36* (2013.01); *C02F 2209/02* (2013.01); *C02F 2305/08* (2013.01)

(58) Field of Classification Search
None
See application file for complete search history.

(56) References Cited

U.S. PATENT DOCUMENTS

| | | |
|---|---|---|
| 5,162,582 A | 11/1992 | Ito et al. |
| 6,447,897 B1 | 9/2002 | Liang et al. |
| 6,890,504 B2 | 5/2005 | Keller et al. |
| 7,347,988 B2 | 3/2008 | Hu et al. |
| 7,420,024 B2 | 9/2008 | Chu et al. |
| 7,887,880 B2 | 2/2011 | Zhao et al. |
| 7,981,688 B2 | 7/2011 | Stayton et al. |
| 7,989,505 B2 | 8/2011 | Hu et al. |
| 8,158,002 B1 * | 4/2012 | Lupton ............... B01D 29/114 210/198.2 |

(Continued)

FOREIGN PATENT DOCUMENTS

WO      WO 0054866 A1 *   9/2000          B01D 29/114

OTHER PUBLICATIONS

Xu et al, "Fe/Pd Nanoparticle Immobilization in Microfiltration Membrane Pores: Synthesis, Characterization, and Application in the Dechlorination of Polychlorinated Biphenyls", Ind. Eng. Chem. Res. 46, 2348-2359, 2007.*

(Continued)

*Primary Examiner* — Jonathan M Peo
(74) *Attorney, Agent, or Firm* — King & Schickli, PLLC

(57) ABSTRACT

A water purification device is provided in the form of a hydrogel matrix containing immobilized nanoparticles that are directly synthesized in-situ in the hydrogel matrix. The hydrogel matrix is temperature sensitive, such that swelling draws in pollutants that are captured by the nanoparticles, while deswelling releases purified water. A related method of decontaminating the water supply contaminated with a target pollutant is also disclosed.

11 Claims, 5 Drawing Sheets

(56) References Cited

U.S. PATENT DOCUMENTS

Figure 1:
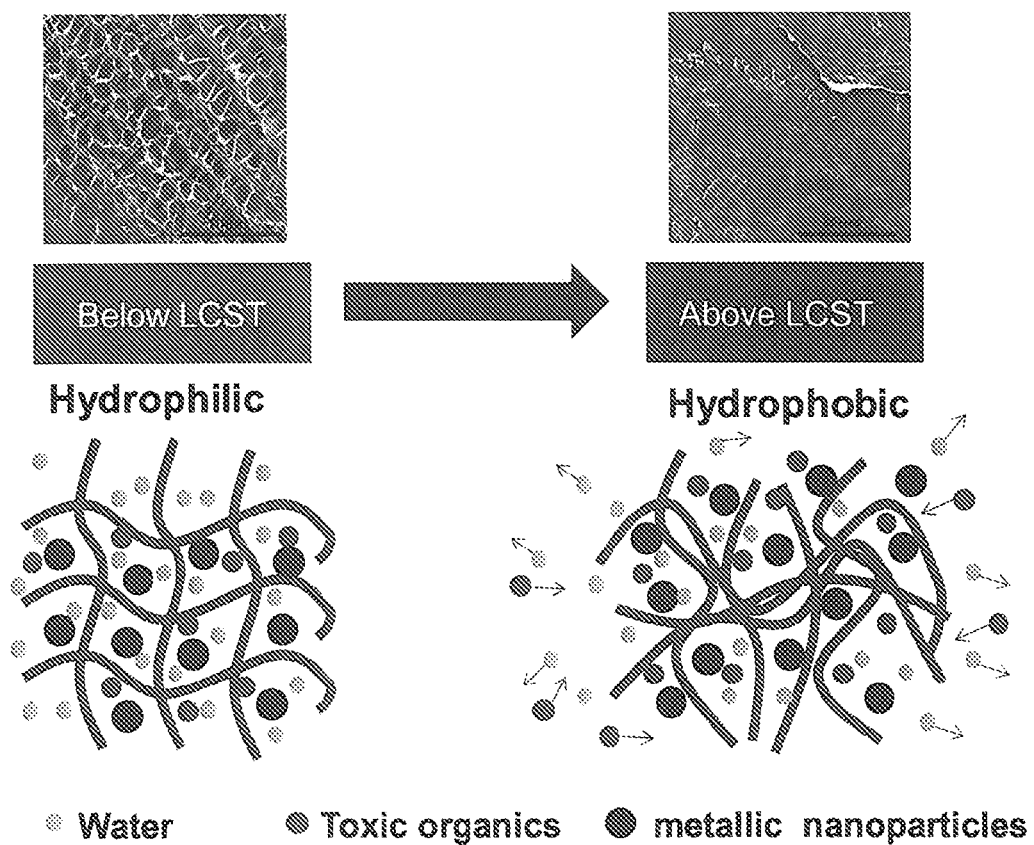

| | | | |
|---|---|---|---|
| 2003/0138490 A1 | 7/2003 | Hu et al. | |
| 2007/0119785 A1 | 5/2007 | Englehardt et al. | |
| 2008/0176768 A1 | 7/2008 | Zheng et al. | |
| 2009/0028810 A1 | 1/2009 | Zhang | |
| 2010/0028436 A1* | 2/2010 | Ohrlander | A61L 15/18 424/487 |
| 2010/0155323 A1* | 6/2010 | Weiss | C08F 255/00 210/321.6 |
| 2010/0203141 A1* | 8/2010 | Yarin et al. | 424/486 |
| 2010/0224555 A1* | 9/2010 | Hoek et al. | 210/500.42 |
| 2010/0231433 A1 | 9/2010 | Tishin et al. | |
| 2011/0042325 A1 | 2/2011 | Bezbaruah et al. | |
| 2011/0095756 A1 | 4/2011 | Van Bruggen et al. | |
| 2011/0110723 A1 | 5/2011 | Varma et al. | |
| 2011/0171309 A1 | 7/2011 | Nguyen et al. | |
| 2011/0266492 A1 | 11/2011 | Stayton et al. | |

OTHER PUBLICATIONS

Wang et al, "Hydrophilic and antibacterial properties of polyvinyl alcohol/4-vinylpyridine graft polymer modified polypropylene nonwoven fabric membranes", Journal of Membrane Science, 345, pp. 223-232, 2009.*

Sanchez, Irma Y.and Nicholas A. Peppas, "Feedback Control Systems Using Environmentally and Enzymatically Sensitive Hydrogels", Biomedical Applications of Hydrogels Handbook, pp. 45-64, May 17, 2010.*

Xu et al, "Synthesis of nanoscale bimetallic particles in polyelectrolyte membrane matrix for reductive transformation of halogenated organic compounds", Journal of Nanoparticle Research, 7: pp. 449-467, 2005.*

Ju et al., "Novel heavy-metal adsorption material: ion-recognition P(NIPAM-co-BCAm) hydrogels for removal of lead(II) ions", Journal of Hazardous Materials, 167, 2009, pp. 114-118, 5 total pages.*

Krusic et al., "Copolymer hydrogels based on N-isopropylacrylamide and itaconic acid", Polymer, 47, 2006, 148-155, 8 total pages.*

Schmidt et al., "Packing Density Control in P(NIPAM-co-AAc) Microgel Monolayers: Effect of Surface Charge, pH, and Preparation Technique", Langmuir, 24, pp. 12595-12602, 2008, 8 total pages.*

Zhang et al., "Dual thermo- and pH-sensitive poly(N-isopropylacrylamide-co-acrylic acid) hydrogels with rapid response behaviors", Polymer, 48, pp. 1718-1728, 2007, 11 total pages.*

"Chemistry II: Water and Organic Molecules", M.J. Farabee, obtained from Web Oct. 22, 2018, published 2007, https://www2.estrellamountain.edu/faculty/farabee/biobk/BioBookCHEM2.html, 24 total pages.*

W. Scott Orth, et al.; "Dechlorination of Trichloroethene in Aqueous Solution Using Fe0"; Environmental Science & Technology, vol. 30, No. 1, pp. 66-71; 1996.

"Making Plastics: From Monomer to Polymer", American Institute of Chemical Engineers CEP, Sep. 2015.

"Polyesters-Many Uses of Ethylene Glycol", accessed at http://www.pslc.ws/macrog/pet.htm—Polymer Science Learning Center.

* cited by examiner

WATER PURIFICATION DEVICE AND A METHOD OF DECONTAMINATING A WATER SUPPLY

This document claims the benefit of U.S. provisional patent application Ser. No. 61/551,631 filed on 26 Oct. 2011, the full disclosure of which is incorporated herein by reference.

This invention was made with at least partial government support under NIEHS contract no. P42ES007380. The government may have certain rights in this invention.

TECHNICAL FIELD

This document relates generally to the field of water remediation of purification and more particularly to a new and improved water purification device and method of decontaminating a water supply.

BACKGROUND SECTION

Devices utilizing nanoparticles for the remediation or purification of a water supply are well known in the art. Examples of such devices are disclosed in U.S. Pat. No. 7,887,880 to Zhau et al. and United States Patent Application Publication No. 2011/0110723 to Varma et al.

Nanosized materials have been widely studied and investigated in various areas including that of toxic chlorinated organics degradation and water pollution remediation. Nanoscale metallic particles with high surface area and high binding energy with core electrons may enhance the interaction of the surface sides between the reactants and products. However, nanoparticles naturally tend to aggregate and that aggregation may lead to loss of de-chlorination reactivity. As a result, stabilizers, ligaments and membrane supports have been developed and utilized in an effort to immobilize the nanoparticles.

This approach has resulted in one problem which is the sacrifice of nanoparticle reactivity. The water purification device and a method of decontaminating a water supply described in this document overcome this problem and enhance the performance of the nanoparticles. Specifically, the water purification device utilizes the direct synthesis of immobilized nanoparticles in a hydrogel network or matrix. The resulting nanoparticles are smaller in size than those incorporated into a hydrogel matrix by other methods. Accordingly, the nanoparticles exhibit higher surface areas offering increases in reactivity. Further, the nanoparticles are more homogenously dispersed throughout the hydrogel matrix and the resulting lack of aggregation increases access to the surface area of the nanoparticles and further enhances reactivity. Still further the controlled swelling and deswelling of the hydrogel matrix allows control of water fraction and target pollutant partitioning in the hydrogel matrix that further optimizes resulting remediation activity of the device and associated method.

SUMMARY SECTION

In accordance with the purposes and advantages disclosed herein, a method of decontaminating a water supply contaminated with a target pollutant comprises contacting the contaminated water supply with a hydrogel matrix containing an immobilized nanoparticles catalyst and decomposing the target pollutant and purifying the water supply. The method may be further described as including using a temperature responsive hydrogel matrix and adjusting temperature to selectively swell and deswell the hydrogel matrix thereby controlling water fraction and target pollution partitioning in the hydrogel matrix. In alternative embodiments the hydrogel matrix is pH responsive or light responsive.

The method may be a batch process wherein hydrogel matrix containing an immobilized nanoparticle catalyst is added to the water supply. After the necessary residence time for target pollutant decomposition, the method includes removing the hydrogel matrix from the treated water. In an alternative embodiment the method is a continuous process and includes the steps of incorporating the hydrogel matrix into a membrane and flowing the contaminated water supply through that membrane.

In accordance with another aspect, a water purification device is provided. The water purification device comprises a hydrogel matrix containing immobilized nanoparticles that are directly synthesized in-situ in the hydrogel matrix. The immobilized nanoparticles of such a device are characterized by enhanced surface area and enhanced dispersion so as to provide improved reactivity as compared to nanoparticles positioned in the hydrogel matrix by encapsulation methods known in the art.

The hydrogel matrix may be temperature responsive, pH responsive or light responsive.

The immobilized nanoparticles are made from a material selected from a group consisting of a metal, iron, silver, copper, zinc, nickel, gold, palladium, platinum and mixtures thereof. The immobilized nanoparticles have an average size of about 40 nm, are homogeneously distributed through the hydrogel matrix and have a surface area normalized reactivity of at least about 0.006 $L/m^2h$. Further the particles are substantially spherical in shape.

Alternatively the water purification device may be defined as comprising a hydrogel matrix containing immobilized nanoparticles having a size of between about 5 nm to about 100 nm and a dispersion of between about 0.1% and about 5%.

BRIEF DESCRIPTION OF THE DRAWING FIGURES

Figure 2:
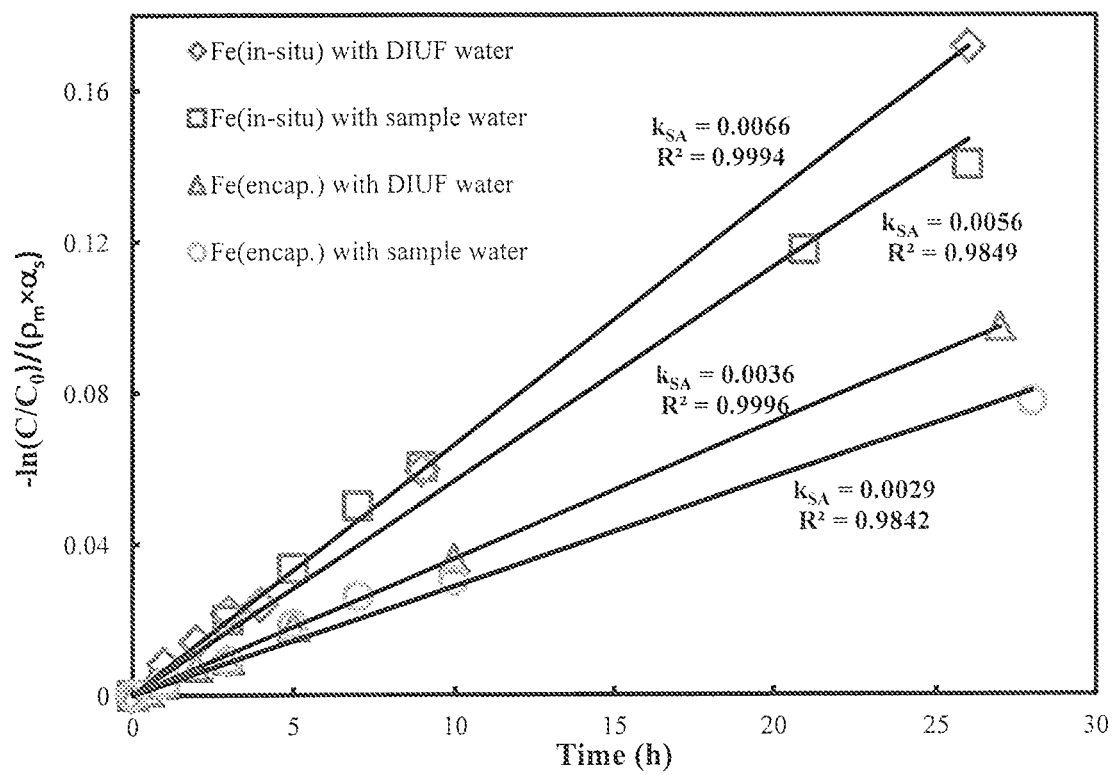
Figure 3:
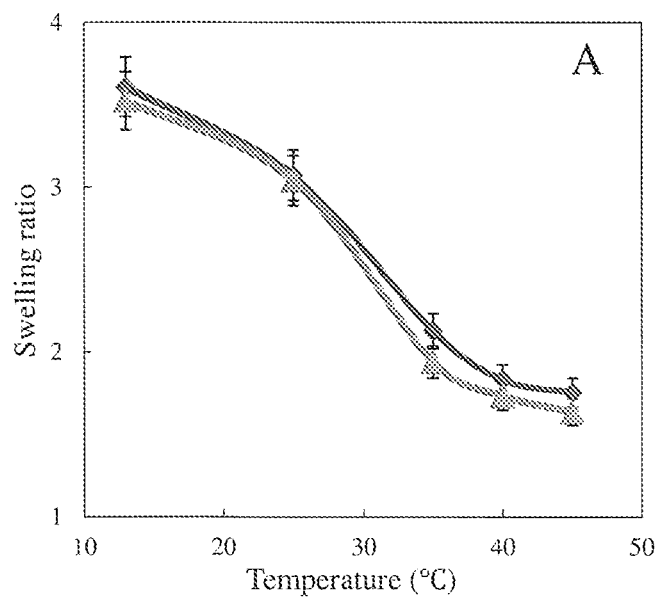

The accompanying drawing figures incorporated herein and forming a part of the specification, illustrate several aspects of the present device and method and together with the description serve to explain certain principles thereof. In the drawings:

FIG. 1 is a schematical representation of the water purification device;

FIG. 2 is a graphical representation for trichloroethene (TCE) dechlorination of deionized ultra-filtered (DIUF) water and "real" water (Paducah, Ky.) with Fe nanoparticles in-situ and encapsulated in P(NIPAAm-AA) hydrogel. Vol.=43 mL, initial pH: 7 (for DIUF) and 7.49 (for real water); initial TCE concentration: 30 mg/L, iron loading amount: 1 g/L; Temperature: 25° C. Triangles: $Fe^0$ nanoparticles stabilized with carboxymethyl cellulose (CMC) in solution phase. Circles: preformed $Fe^0$ nanoparticles encapsulated in hydrogel network. Diamonds: $Fe^0$ nanoparticles in hydrogel (1.3 wt % Fe loading) by in-situ synthesis. Vol.=43 mL, Temperature: 25° C., initial pH: 6.82, 6.73, 6.88; final pH: 8.23, 8.65, 8.42), initial TCE concentration: 30 ppm, iron loading amount: 1 g/L);

FIG. 3 is a graphical representation of the swelling ratio of different systems and different temperature. Diamonds: blank poly(N-isopropylacrylamide) (P(NIPAAm-AA) hydrogel without any nanoparticles. Square: P(NIPAAm-AA) hydrogel with 1 wt % nanoparticles by encapsulation.

Figure 4:
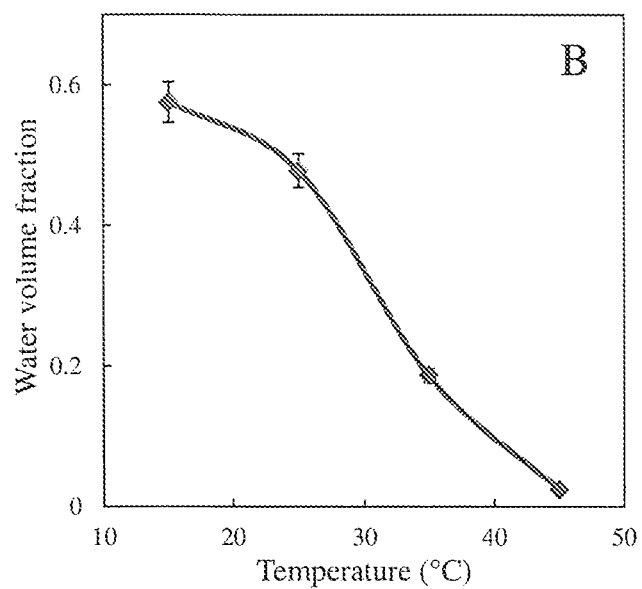
Figure 5:
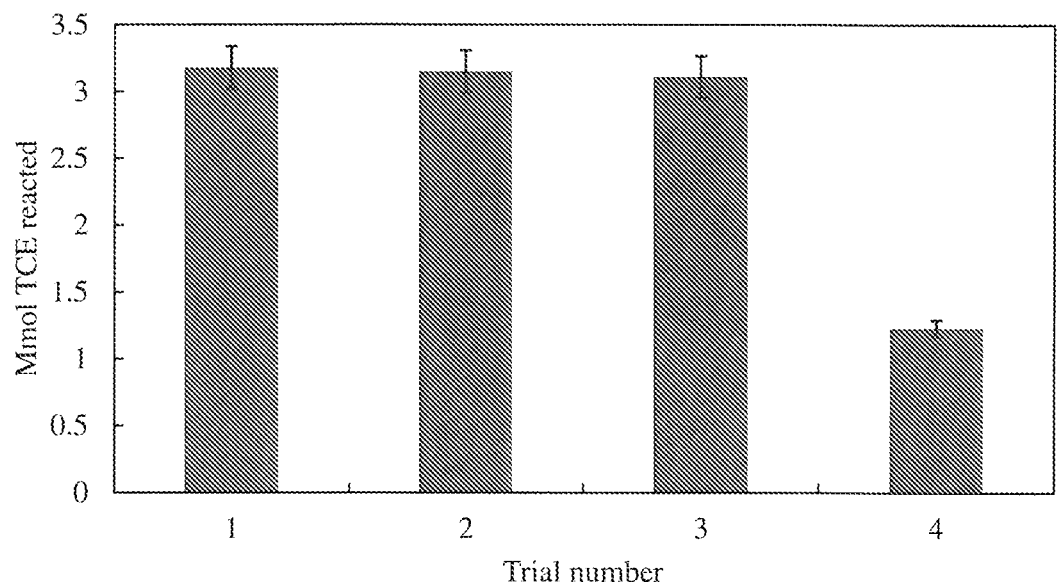

Triangles: P(NIPAAm-AA) hydrogel with 0.95 wt % nanoparticles by in-situ synthesis (dry weight 0.2 g, pH at 25° C.: 6.86);

FIG. 4 is a graphical representation of the free volume calculated based on the swelling study of the hydrogel (dry weight 0.2 g, pH at 25° C.: 7.1);

FIG. 5 is a bar graph representing nanoparticles stability (6 hours for each dechlorination experiment, and storage time effect) in terms of TCE dechlorination with Fe/Pd (1.46 wt % Pd coating) nanoparticles in hydrogel network in repeat batch experiment. Initial TCE concentration is 10 mg/L for each cycle. Iron dose: 20 mg; Volume 43 mL; initial pH 6.3~6.5, final pH 7.8~8.1, temperature 25° C. After one trial, the hydrogel containing nanoparticles was stored in ethanol for 15 hours, 3 days and 15 days respectively to conduct additional trials.

Figure 6:
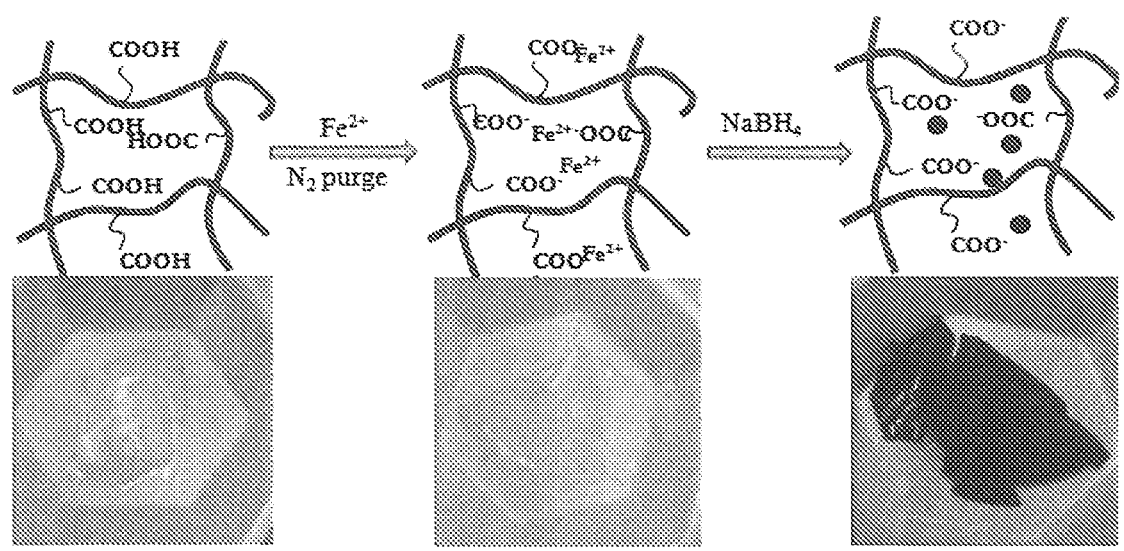
Figure 7:
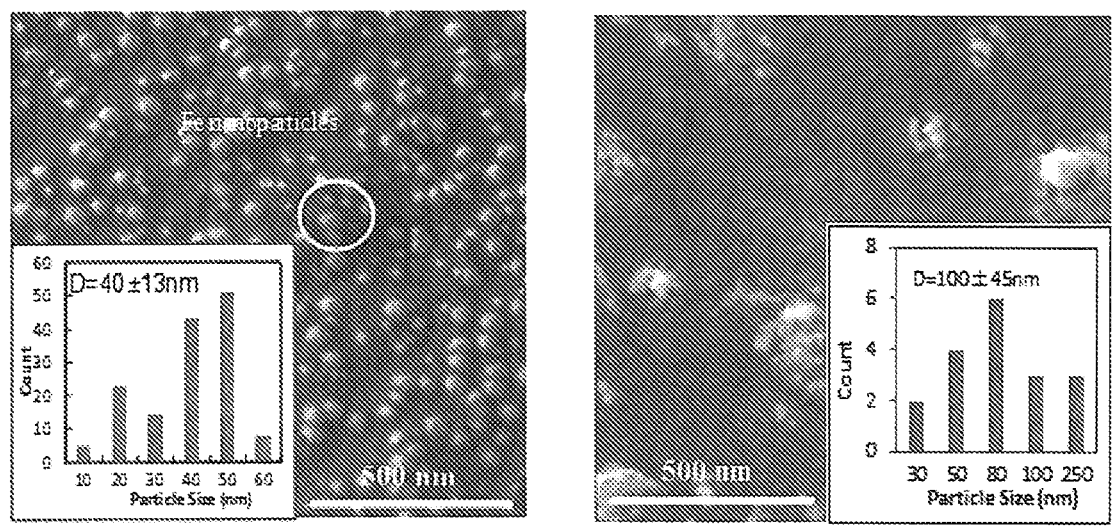
Figure 8:
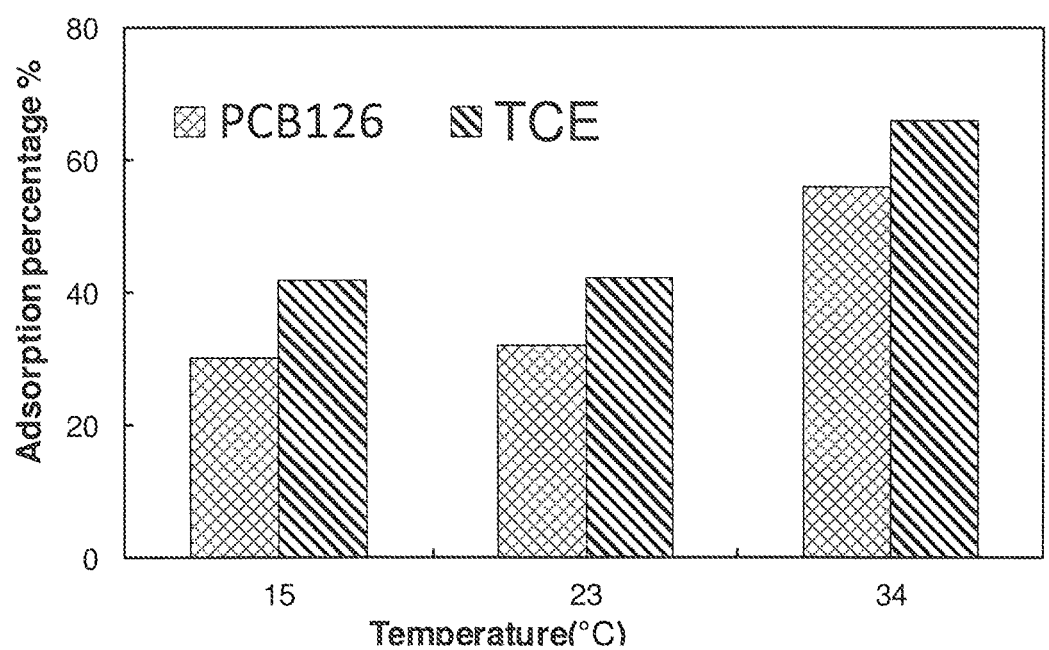

FIG. 6 is a schematical representation of the direct formation of $Fe^0$ nanoparticles in P(NIPAAm-AA) hydrogel network and corresponding digital camera images;

FIG. 7 is SEM images of Fe nanoparticles in-situ synthesized (left) and externally encapsulated (right) into a hydrogel network including respective graphic illustration of corresponding particle size distribution; and FIG. 8 is a bar graph illustrating normalized TCE and PCB 126 adsorption through temperature responsive P(NIPAAm-AA) hydrogel below LCST (15° C. and 23° C.) and above LCST (34° C.), feed concentration: 0.2 mM TCE and 0.016 mM PCB126, 20 mL, pH=6.8.

Reference will now be made in detail to the present preferred embodiments of the device and method, examples of which are illustrated in the accompanying drawing figures.

DETAILED DESCRIPTION OF PREFERRED EMBODIMENTS

Reference is now made to FIG. 1 schematically illustrating the water purification device 10 comprising a hydrogel matrix 12 containing immobilized nanoparticles 14.

The hydrogel matrix 12 may be made from a stimulus responsive material. For example, the hydrogel matrix 12 may be made from a temperature responsive material such as poly(N-isopropylacrylamide). In another alternative embodiment the hydrogel matrix 12 may be made from a pH responsive material such as poly (vinyl alcohol) (PVA) and poly(4-vinylpyridine) (P4VP). In yet another possible embodiment the hydrogel matrix 12 may be made from a light responsive material such as fumaric amide and cinnamic acid (CA). By adjusting the particular stimulus to which the hydrogel matrix 12 is responsive it is possible to swell or deswell the hydrogel matrix. As illustrated in FIG. 1 on the left side, for a temperature responsive hydrogel matrix at 30° the material swells drawing water represented by dots 16 and a target pollutant such as trichloroethene (TCE) represented by dots 18 into the structure of the matrix 12. In contrast, by raising the temperature to about 34° C., the hydrogel matrix 12 deswells collapsing the matrix by the expulsion of water 16 (note right hand side of FIG. 1). At the same time the target pollutant 18 is maintained in close proximity to the nanoparticles 14 to allow for the decomposition of the target pollutant and the purifying of the water supply. As should be appreciated, by adjusting the appropriate stimulus (e.g. temperature, pH, light) it is possible to selectively swell and deswell the hydrogel matrix 12 thereby controlling the water fraction and target pollutant partitioning in the hydrogel matrix in a manner that allows the optimizing of reaction conditions for the most efficient and effective decomposing of the target pollutant and purifying of the water supply.

The immobilized nanoparticles may be made from substantially any appropriate catalyst useful for the intended purpose including but not limited to materials selected from the group consisting of metal, iron, silver, copper, zinc, nickel, gold, palladium, platinum and mixtures thereof. Iron and iron/palladium nanoparticles are of particular interest for purposes of water remediation.

In accordance with a significant aspect of the device, the immobilized nanoparticles 14 are directly synthesized in-situ in the hydrogel matrix 12. Such immobilized nanoparticles are characterized by enhanced surface area and enhanced dispersion so as to provide improved reactivity as compared to nanoparticles positioned in the hydrogel matrix by encapsulation or other means known in the prior art.

Typically the immobilized nanoparticles 14 have an average size of 40 nm or less and are homogeneously distributed through the hydrogel matrix 12. The immobilized nanoparticles 14 are also substantially spherical in shape.

In accordance with one embodiment the immobilized nanoparticles have a size of between about 5 nm and about 100 nm and a dispersion of between about 0.1% and about 5%.

In accordance with one particularly useful embodiment of the water purification device 10, the hydrogel matrix 12 is made from temperature responsive poly(N-isopropylacrylamide). The synthesis flow chart for the poly(N-isopropylacrylamide) hydrogel and the corresponding mechanism are illustrated below.

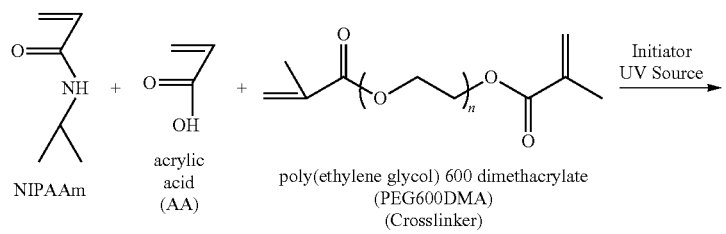

-continued

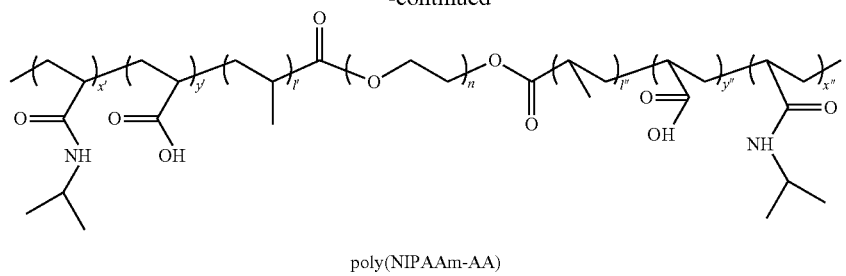

poly(NIPAAm-AA)

Such a hydrogel matrix 12 has a porous structure which effectively increases the accessibility to the immobilized metallic nanoparticles 14. Further the poly(acrylic acid) component of the hydrogel offers the chelating ligands to coordinate with the metal ions and therefore immobilize the metallic nanoparticles into the hydrogel network. At the same time the thermo-sensitive NIPAAm segments swell and deswell reversibly so that one can adjust the concentration of target pollutants and the immobilized nanoparticles in the hydrogel matrix to modify, tune and optimize the reduction reaction leading to decomposition of the target pollutant. Furthermore, the swelling/deswelling facilitates the regeneration and the reusability of the nanoparticles.

FIG. 6 illustrates how iron nanoparticles 14 are synthesized firstly by coordination with ferrous ions through the carboxyl acid groups and then reduced with $NaBH_4$. Correspondingly, the hydrogel color changes from white to black due to the formation of $Fe^0$ nanoparticles inside the hydrogel network 12. For purposes of comparison, $Fe^0$ nanoparticles were also immobilized in a hydrogel by encapsulation. As shown in the SEM images of FIG. 7, the $Fe^0$ nanoparticles directly synthesized in the hydrogel are substantially spherical with homogenous distribution and an average size of about 40 nm which is smaller than those encapsulated in a hydrogel network. It is hypothesized this is because of the aggregation of the encapsulated nanoparticles during mixing of the monomers and the polymerization versus the direct formation of the nanoparticles in-situ in the hydrogel network.

The Fe and bimetallic Fe/Pd nanoparticles have been used to degrade toxic organics with trichloroethylene (a common pollutant in groundwater) being used as a model compound. It is well known that dechlorination by Fe nanoparticles, occurs via electron transfer mechanism which are generated from $Fe^0$ corrosion; while in the Fe/Pd bimetallic system, $H_2$ was generated by Fe corrosion and Pd acts as a catalyst (the dechlorination occurs on Pd surface). The dechlorination performance for $Fe^0$ nanoparticles immobilized in a hydrogel network is shown in FIG. 2. Most of the bound chloride was converted to $Cl^-$. Some points were taken in duplicate, which shows a good reproducibility and stability (no nanoparticle deactivation observed). The surface area normalized rate constant $k_{SA}$ can be written as: $dC/dt = k_{obs}C = k_{SA}\alpha_S\rho_m C$, where "$\alpha_S$" is the specific surface area of the nanoparticles ($m^2/g$) and $\rho_m$ is the nanoparticle loading (g/L). As the FIG. 1 shows, the calculated $k_{SA}$ values for the nanoparticles for DIUF water dechlorination were determined to be 0.0066 $L/m^2h$ for in-situ synthesized $Fe^0$ in P(NIPAAm-AA) hydrogel and 0.0036 $L/m^2h$ for $Fe^0$ encapsulated in hydrogel. Chloride was formed as the only product in solution phase, and the chloride balances were defined as the ratio of detected chloride ($[Cl^{-1}]$) over the theoretical formation of chloride ($[Cl^{-1}]_{max}$) calculated from the TCE degradation data. The formed chloride balances obtained in the above systems were about 90%. The higher reaction rates for in-situ synthesized $Fe^0$ is attributed to the high surface area of small particles and the prevention of aggregation by the hydrogel support. Also, the more free spaces left after direct reduction within the networks may facilitate the transportation of TCE inside the hydrogel network and as well as enhance the reaction on the reactive sites of the nanoparticles. It is also important to mention that during TCE degradation, the $Fe^{2+}/Fe^{3+}$ ions that are formed from the reactant $Fe^0$ are recaptured by the carboxylic acid groups from AA, which can prevent the formation of precipitate that can inhibit the dechlorination reaction. This also makes it easy for recovered ions to be regenerated to the metal form. In contrast to the homogeneous phase nanoparticles applications, our approach has almost no loss of iron to solution phase. In addition, TCE degradation was also conducted with sample water from a contaminated site in Paducah, Ky. containing 82 mg/L alkalinity, 293 mg/L total dissolved solids and 1.2 mg/L turbidity. The detailed water quality analysis was reported in literature. As shown in FIG. 1, the difference of the degradation results between DIUF and sample water was within 2% for the same feed TCE concentration, which indicates the insignificant impact of hydrogel network on dechlorination in the contaminated sites. This also demonstrates that our system can be applied to the real world. It should be noticed that control experiments were also conducted to prove that TCE evaporation and physical adsorption in hydrogel has no effects on the TCE degradation. The whole hydrogel was extracted with pentane and no TCE detected by GC-MS and also, the TCE concentration was within 10% of the original value, which can prove that TCE concentration decrease during dechlorination studies is completely due to reaction with Fe nanoparticles.

As shown in FIG. 2, the reaction for $Fe^0$ encapsulated in the hydrogel was lower than for Fe in solution phase. This is reasonable due to the slower diffusion for the nanoparticles within hydrogel network. The proximity of the reaction rates for $Fe^0$ in solution phase and $Fe^0$ synthesized directly in hydrogel is attributed to the high surface area of small particles and the prevention of aggregation in the hydrogel support. Also, the more free spaces left after direct reduction within the networks may facilitate the transportation of TCE inside the hydrogel network, as well as enhance the reaction on the reactive sites of the nanoparticles. It is also important to mention that during TCE degradation, the $Fe^{2+}/Fe^{3+}$ ions that are formed from the reactant $Fe^0$ are recaptured by the carboxylic acid groups from AA, which can prevent the formation of precipitate that can inhibit the dechlorination reaction. This also makes it easy for recovered ions to be regenerated to the metal form. In contrast to the homogeneous phase nanoparticles applications, our approach has almost no loss of iron to solution phase.

In addition to the prevention of agglomeration of nanoparticles, another advantage of using the temperature responsive hydrogels is the potential change in observed particle reactivity via the temperature change in state. Since the complete access to nanoparticles immobilized in a hydrogel network is a prerequisite for better reactive performance, the swelling of the hydrogel in water leads to a higher nanoporosity which makes the iron nanoparticles accessible to TCE. On the other hand, the deswelling of hydrogel helps expel most of water out of the hydrogel and increase the local TCE concentration in the hydrogel network. As the general reaction mechanism indicated, the higher concentration in the confined space will lead to a higher reaction rate. Thus, the physical reversible swelling and deswelling of temperature responsive hydrogel plays a significant role in the improvement of the dechlorination activity.

To further study the swelling and deswelling behavior of the system, the swelling ratios were measured at different temperatures for the various hydrogel systems. As shown in FIG. 3, the swelling ratio decreases with an increase of temperature for all three systems. The observed larger water content decrease in hydrogel at higher temperatures is consistent with the phase change behavior. Also, the presence of nanoparticles in the nanocomposite hydrogel does not appear to have significant effects on the swelling ratio, which may be because of the free space left after the in-situ reduction of nanoparticles. The free volume at different temperatures was also calculated based on the initial and final diameter and thickness of the hydrogel and is shown in the FIG. 4. Clearly, as the temperature increases, the free volume decreases and the water is expelled out of the hydrogel network, which results in an improvement of reactivity as discussed previously. But, the further increasing of temperature up to 45° C. leads to the vanishing of free volume and the decreasing of reactivity as the water is completely expelled out at this point.

To investigate the effects of temperature on TCE dechlorination with hydrogel nanocomposites, the dechlorination performance by Fe/Pd bimetallic nanoparticles immobilized in a hydrogel were studied at 34° C. and 30° C. The second metal (Pd) in the nanoparticles functions as a catalyst in the dehalogenation, which is expected to accelerate the reaction and to reduce the effects of TCE volatility. Table 1 shows that the $k_{SA}$ for hydrogel nanocomposites at 34° C. was almost 3 times larger than that at 30° C.

| Reaction system | $k_{SA}$(L h$^{-1}$ m$^{-2}$) | $R^2$ |
| --- | --- | --- |
| Nano Fe/Pd (1.46 wt % Pd) in solution phase at 30° C. | 0.0275 ± 0.0014 | 0.9783 |
| Nano Fe/Pd (1.46 wt % Pd) in solution phase at 34° C. | 0.0568 ± 0.003 | 0.9437 |
| Hydrogel immobilized Fe/Pd (1.46 wt % Pd) nanoparticles at 30° C. | 0.0156 ± 0.0008 | 0.9799 |
| Hydrogel immobilized Fe/Pd (1.46 wt % Pd) nanoparticles at 34° C. | 0.0411 ± 0.002 | 0.956 |

On the other hand, the control experiments without any hydrogel showed an increase of only two fold which demonstrates the importance of hydrogel tunable properties. It should be mentioned that the reactivity here is lower than the referenced value. That may be because the Fe/Pd reactivity is a strong function of Pd loading amount. The TCE dechlorination rates could be variable for 1-5 magnitude by changing the Pd loading amount. TCE adsorption on reactive sites can be realized via the mass transfer from aqueous phase to hydrogel matrix. The TCE diffusion rate in hydrogel networks should be faster than that in the aqueous phase when the hydrophobicity of the hydrogel increases via a temperature increase, helping to enhance the overall dechlorination rate. Herein, it should be pointed out that the hydrogel can be utilized as not only the support of the Fe or Fe/Pd nanoparticles, but also the reaction medium.

Lastly, to study the aging and stability of the bimetallic nanoparticles system over time, multi-trial TCE dechlorination studies (6 h for one trial) were conducted in a 40 mL batch solution containing 20 mg Fe/Pd nanoparticles immobilized in hydrogel with repeated TCE supplement. Initial TCE concentration for each trial was 10 mg/L. As shown in FIG. 5, complete TCE degradation was achieved in 6 h. After the first trial, the hydrogel nanocomposites were stored in solution for 10 h without TCE supplement. The two additional trials were conducted with the same nanoparticles. There was no obvious reduce of dechlorination rate. For the last trial, the nanoparticles were stored for another 15 days, and about 40% of TCE was degraded. Chloride analysis results showed that there was no obvious loss of reactivity for these hydrogel nanocomposites. In addition, to explore possible leaching of the Fe and Pd nanoparticles into the solution, the metal concentration loss in each trial was determined to be about 0.76% for iron and 0.5% for palladium with atomic absorption spectroscopy (AAS) analysis. The insignificant reduction of reactivity indicates that hydrogel nanocomposites can be a promising candidate for the dechlorination application.

A method of decontaminating a water supply contaminated with a target pollutant may be broadly described as including the steps of contacting the contaminated water supply with a hydrogel matrix containing an immobilized nanoparticles catalyst and decomposing the target pollutant and purifying the water supply. The method may be further described as including using a temperature responsive hydrogel matrix and adjusting the temperature to selectively swell and deswell the hydrogel matrix thereby controlling the water fraction and target pollutant partitioning in the matrix. In alternative embodiments a pH responsive or light responsive hydrogel matrix may be utilized and the pH or light adjusted to selectively swell and deswell the hydrogel matrix to control water fraction and target pollutant partitioning.

For purposes of batch processing, the method may further include adding the hydrogel matrix containing an immobilized nanoparticles catalyst to the water supply contaminated with a target pollutant. After an appropriate residence time to allow complete decomposing of the target pollutant and purifying of the water supply the method includes removing the hydrogel matrix from the treated water.

In accordance with a continuous processing approach, the method includes incorporating the hydrogel into a membrane and flowing the contaminated water supply through the membrane.

The following synthesis and examples are presented to further illustrate the water purification device and method, but they are not to be considered as limiting in scope N-Isopropylacrylamide (NIPAAm), acrylic acid (AA), poly (ethylene glycol) 600 dimethacrylate (PEG600DMA), 4-(4-Dimethylaminophenylazo) aniline (DMPA), Ethanol (>99.5%), Ferrous chloride tetrahydrate (FeCl$_2$.4H$_2$O), Sodium borohydride (NaBH$_4$), Sodium carboxymethyl cellulose (CMC, mean Mw=90,000), Trichloroethylene (TCE)

were purchased from Sigma-Aldrich. Deionized ultra-filtered water (DIUF) was purchased from Fisher Scientific.

Synthesis of Crosslinked P(NIPAAm-AA) Hydrogel

Three grams of NIPAAm, 1 g AA, 0.207 g PEG600DMA (molar ratio of NIPAAm:AA:PEG600DMA=80:10:10), and 43 mg DMPA as initiator were added in a 20 mL vial; an equal weight amount of ethanol was added and then mixed together to get a uniform solution. The mixture was pipetted into two 15×15 cm$^2$ clamped glass plates with Teflon spacer to make the thickness to be 0.5 mm. Ultraviolet (UV) photopolymerization was conducted for 5 minutes with 14.8 mW/cm$^2$ intensity. Both sides of the hydrogel were exposed to UV light for every 30 s to make sure the same intensity during the polymerization. The hydrogel was carefully removed from the plates, placed in deionized water and washed daily. The proposed schematic of P(NIPAAm-AA) synthesis is shown elsewhere herein.

Synthesis of Nanosized Fe Particles in P(NIPAAm-AA) Hydrogel

Prior to Fe$^{2+}$ ion exchange, P(NIPAAm-AA) hydrogels were immersed in NaCl (5 to 10% wt) solution at pH 10 overnight to convert the —COOH to —COONa. In the next step, the hydrogel was washed with DIUF until the pH of the effluent became neutral. Then, the hydrogel was immersed in 200 mL 200 mg/L FeCl$_2$ solution at a pH of 5.5 for 4 h. Nitrogen gas was bubbled to minimize the oxidation of Fe$^{2+}$. The reduction with sodium borohydride (100 ml, 19 g/L) ensured the Fe$^0$ nanoparticle formation. Typical iron content is 1.3 wt % (based on dry hydrogel). The schematic of Fe$^0$ nanoparticles synthesized directly in the hydrogel network is shown in FIG. 6.

Batch Experiments with TCE

Batch experiments for dechlorination of TCE were conducted in 43 mL serum glass vials 43 mg of Fe or Fe/Pd NPs immobilized in a P(NIPAAm-AA) hydrogel were loaded into the vial containing 30 mg L$^{-1}$ TCE in 43 ml deoxygenated water. All the serum glass vials were sealed with Teflon-lined silicon septa and placed on a wrist-action shaker throughout the duration of the experiment. Parallel control experiments with only hydrogel (no metal particles) were also performed.

Analytical Methods

TCE Degradation.

TCE analysis was performed using a gas chromatograph (GC, Varian-3900) equipped with an ion-trap mass spectrometer (MS, Saturn-2100T). Two milliliter of pentane as the extractant for TCE was added to an 8 mL vial containing 2 mL of aqueous solution which was taken from the reaction vial. The vials were placed on the shaker to mix for 2 hours to achieve extraction equilibrium. For each extracting vial, 1 micro liter solution in the extracting solvent phase was removed and injected into the GC sample column for analysis. 1, 2-dibromoethene was used as an internal standard. External standards of TCE were used to prepare calibration curves. The calibration curves were linear over the concentration range of 5-50 mg L$^{-1}$ (R$^2$>0.999, regressions were based on the 5-point calibration).

Chloride Analysis.

The concentration of chloride ion in the aqueous solution was measured by the Orion 94-17 Solid State half-cell and Orion 96-17 iron plus Sure-Flow with Chloride Electrode. In all cases, the instrument calibration was based on commercial standards (Fisher Scientific) containing 1000 mg L$^{-1}$ of the chloride with R$^2$=0.994 and an average analytical error of 3%. 2% (volume) of sodium nitrate (LabChem Inc., 5 mol/L) was added into the samples as the Ionic Strength Adjuster (ISA) to ensure the same ionic strength.

Metal Analysis.

The amount of Fe captured during ion exchange and Pd in the hydrogel was quantified by using a Varian SpectrAA 220 Fast Sequential atomic absorption spectrometer equipped with a Fisher Scientific hollow cathode lamp. For Fe, the lamp was operated at a wavelength of 386.0 nm. The calibration plot was created using 4 different concentrations of Fe ranging from 25 to 200 mg/L with R$^2$=0.9998 and an average analytical error of 2%. In the case of Pd, the lamp was operated at a wavelength of 246.6 nm and the linear calibration range was between 0.2 and 28 mg/L Pd. The error of analysis was <2% with R$^2$=0.9996.

Characterization of Nanoparticles.

Surface and cross-section of hydrogel and hydrogel nanocomposites were examined by Hitachi S-4300 Scanning Electron Microscope (SEM). Hydrogels were coated with gold for imaging purposes. The particle size and distribution were characterized by SEM 4300 and scanning transmission electron microscopy (TEM, Jeol 2010F) at 200 kV accelerating potential. A specimen=drift-free EDS mapping analysis was performed in TEM to determine element distribution at nano scale.

Results

To prove the use of temperature and pH responsive polymers and hydrogels will allow the tunable control of PCB and TCE detoxification by altering pollutant partitioning and water content around reactive nanoparticles. Equilibrium adsorption of TCE and PCB 126 (as shown in FIG. 8) through temperature responsive. P(NIPAAm-AA) hydrogel indeed demonstrated higher partitioning for both compounds above lower critical solution temperature (LCST) as the enhancement of adsorption amount due to the hydrophobicity increase above LCST. Mass balance was calculated and indicated almost no loss of TCE and PCB 126 (see FIG. 8).

What is claimed:

1. A method of decontaminating a water supply contaminated with a target pollutant comprising:
   contacting said water supply with a temperature responsive hydrogel matrix comprising a cross-linked hydrogel matrix of N-Isopropylacrylamide (N-IPAAm), acrylic acid (AA) and poly (ethylene glycol) 600 dimethacrylate (PEG600DMA) formed with a ratio of 3 g:1 g:0.207 g of NIPAAm:AA:PEG600DMA and an in situ nanoparticle catalyst in the cross-linked hydrogel matrix;
   adjusting the temperature of said water supply to 30° C. to swell the temperature responsive hydrogel matrix;
   adjusting the temperature of said water supply to about 34° C. to deswell the temperature responsive hydrogel matrix by reduction of water content and to maintain the target pollutant in close proximity to the nanoparticle catalyst, thereby decontaminating said water supply.

2. The method of claim 1, further including removing the temperature responsive hydrogel matrix from treated water following target pollutant decomposition.

3. The method of claim 1, further including incorporating the temperature responsive hydrogel matrix into a membrane.

4. The method of claim 3, further including flowing said contaminated water supply through said membrane.

5. A water decontamination device for a target pollutant, comprising:

a temperature responsive hydrogel matrix comprised of a cross-linked hydrogel matrix of N-Isopropylacrylamide (N-IPAAm), acrylic acid (AA) and poly (ethylene glycol) 600 dimethacrylate (PEG600DMA) formed with a ratio of 3 g:1 g:0.207 g of NIPAAm:AA:PEG600DMA and in situ nanoparticles in the cross-linked hydrogel matrix whereby said in situ nanoparticles are characterized by an accessible surface area and homogenous dispersion, and wherein the temperature responsive hydrogel matrix swells at around 30° C. to draw in water with the target pollutant into the temperature responsive hydrogel matrix of the device and deswells at around 34° C. becoming hydrophobic to provide partitioning of the target pollutant with the nanoparticles in the temperature responsive hydrogel matrix of the device as water decontaminated of the target pollutant is expelled out of the temperature responsive hydrogel matrix of the device.

6. The device of claim 5, wherein said nanoparticles are made from a material selected from a group consisting of a metal, iron, silver, copper, zinc, nickel, gold, palladium, platinum and mixtures thereof.

7. The device of claim 5, wherein said nanoparticles (1) have an average size of about 40 nm (2) are homogeneously distributed through said hydrogel matrix and (3) have a surface area normalized reactivity of at least about 0.006 $L/m^2h$.

8. The device of claim 7, wherein said nanoparticles are substantially spherical in shape.

9. The device of claim 5, wherein said nanoparticles have a size of about 40 nm.

10. A water decontamination device, comprising:

a hydrogel matrix comprising a cross-linked hydrogel matrix of N-Isopropylacrylamide (N-IPAAm), acrylic acid (AA) and poly (ethylene glycol) 600 dimethacrylate (PEG600DMA) formed with a ratio of 3 g:1 g:0.207 g of NIPAAm:AA:PEG600DMA and in situ nanoparticles in the cross-linked hydrogel matrix having a size of about 40 nm, wherein the hydrogel matrix swells at around 30° C. to draw in water with a target pollutant into the hydrogel matrix of the device and deswells at around 34° C. becoming hydrophobic to provide partitioning of the target pollutant with the nanoparticles in the hydrogel matrix of the device as water decontaminated of the target pollutant is expelled out of the hydrogel matrix of the device.

11. The device of claim 10, wherein said nanoparticles are made from a material selected from a group consisting of metal, iron, silver, copper, zinc, nickel, gold, palladium, platinum and mixtures thereof.

* * * * *